(12) United States Patent
Russell

(10) Patent No.: US 8,127,809 B2
(45) Date of Patent: Mar. 6, 2012

(54) ENERGY EFFICIENT WHEEL SYSTEM

(76) Inventor: Brian A. Russell, Littleton, CO (US)

( * ) Notice: Subject to any disclaimer, the term of this patent is extended or adjusted under 35 U.S.C. 154(b) by 236 days.

(21) Appl. No.: 12/503,296

(22) Filed: Jul. 15, 2009

(65) Prior Publication Data

US 2010/0013293 A1 Jan. 21, 2010

Related U.S. Application Data

(60) Provisional application No. 61/081,249, filed on Jul. 16, 2008.

(51) Int. Cl.
*B60B 9/10* (2006.01)
(52) U.S. Cl. .................. 152/40; 152/47; 152/5
(58) Field of Classification Search .............. 152/1, 5–7, 152/17–18, 20, 40–42, 44, 47–50
See application file for complete search history.

(56) References Cited

U.S. PATENT DOCUMENTS 863,827 A 8/1907 Alloatti
(Continued)

FOREIGN PATENT DOCUMENTS

GB 12249 5/1906

*Primary Examiner* — Jason Bellinger
(74) *Attorney, Agent, or Firm* — Kilpatrick Townsend & Stockton LLP

(57) ABSTRACT

A vehicle wheel assembly and a method of making the wheel assembly. In one embodiment, a wheel assembly may include a rim, a hoop member, and a resilient member. The hoop member may be disposed around the rim and spaced apart from the rim. The resilient member may be disposed around the hoop member, and portions of the resilient member may protrude through openings in the hoop member toward the rim. A tying member may tie each protruding portion to the rim, and the tying members may remain in tension while the wheel assembly is unloaded. In other embodiments, the wheel assembly may also include a second hoop member, or a traction layer, or both.

23 Claims, 14 Drawing Sheets

A-A

U.S. PATENT DOCUMENTS

| | | | |
|---|---|---|---|
| 976,762 A * | 11/1910 | Wible | 152/6 |
| 1,012,331 A | 12/1911 | Cunningham | |
| 1,024,091 A | 4/1912 | Martin et al. | |
| 1,054,444 A | 2/1913 | Olivier | |
| 1,066,784 A * | 7/1913 | Barrett | 152/40 |
| 1,123,529 A | 1/1915 | Harlan | |
| 1,134,291 A | 4/1915 | Spencer | |
| 1,213,834 A | 1/1917 | Bunzlau et al. | |
| 1,233,462 A | 7/1917 | Frommann | |
| 1,312,582 A | 8/1919 | Schneible | |
| 1,319,726 A | 10/1919 | Schramm | |
| 1,350,370 A | 8/1920 | Leviston et al. | |
| 1,403,115 A | 1/1922 | Golein | |
| 1,447,365 A | 3/1923 | Walther | |
| 1,449,920 A | 3/1923 | Stanley | |
| 1,519,971 A | 12/1924 | Hale | |
| 1,555,479 A | 9/1925 | Morand | |
| 1,646,480 A | 10/1927 | Harpstrite | |
| 1,650,271 A | 11/1927 | Harpstrite | |
| 1,684,596 A | 9/1928 | Patch | |
| RE23,161 E | 10/1949 | MacLean | |
| 4,573,510 A | 3/1986 | Ippen et al. | |
| 5,372,170 A | 12/1994 | Hynes | |
| 6,701,985 B2 | 3/2004 | Russell | |
| 6,732,775 B1 | 5/2004 | Kikuchi et al. | |
| 6,782,930 B2 * | 8/2004 | Kikuchi et al. | 152/44 |
| 7,104,297 B2 * | 9/2006 | Russell | 152/41 |

* cited by examiner

B-B

ENERGY EFFICIENT WHEEL SYSTEM

This application claims priority to provisional application 61/081,249, filed Jul. 16, 2008 and titled "Energy Efficient Wheel System," the entire disclosure of which is hereby incorporated by reference herein for all purposes.

BACKGROUND

Wheeled vehicles have been in use for centuries, and wheel construction has evolved as materials, manufacturing methods, and performance needs have evolved. Pneumatic (air filled) tires have been the norm for most vehicles in the United States for most of the past century.

It is estimated that at highway speeds, about seven percent of the energy content in a car's fuel is expended simply in overcoming rolling resistance. Given that up to 69 percent of the energy content is lost in a car's engine during highway driving, about 22 percent of the useful mechanical energy produced by the car's engine may be expended in overcoming rolling resistance. Much of that rolling resistance is due to energy expended in deformation of the car's tires. Because the tires are viscoelastic, and not perfectly elastic, not all of the energy required to deform the tire is returned when the deformed part of the tire regains its shape. One portion of the tire that deforms is the sidewall. There is accordingly a need to reduce energy dissipated in tire sidewall deformation.

Pneumatic tires have the further disadvantage that they can be punctured and deflated by road hazards and the like. With most pneumatic tires, a tire puncture necessitates an immediate, inconvenient and costly repair.

SUMMARY

In accordance with one embodiment of the invention, an exemplary vehicle wheel assembly for use with a wide range of wheeled vehicles and other apparatus is provided. In one embodiment, a wheel assembly may include a rim and a hoop member. The rim may have a round peripheral portion, and the hoop member may have a round main portion. The hoop member may be disposed around the rim and spaced apart from the rim. The main portion may have a plurality of access openings. A resilient member may be disposed around and in contact with an outside surface of the main portion of the first hoop member. Portions of the resilient member may protrude into or through the access openings in the first hoop member and toward the rim. A plurality of tying members may tie the resilient member to the rim, each tying member connecting one protruding portion to the rim. Each tying member may be in tension when the wheel assembly is unloaded. In some embodiments, an outside surface of the resilient member may also be a traction surface of the wheel assembly. In some embodiments, a traction layer may be disposed around an outside surface of the resilient member.

In some embodiments, a round second hoop member may be disposed around an outside surface of the resilient member, and a traction layer may be disposed around an outside surface of the second hoop member. In some embodiments, the second hoop member may have a plurality of access holes that substantially align radially with the access openings in the first hoop member. In some embodiments, the first hoop member may comprise first and second edges and a flange extending outward from each of the first and second edges, and the resilient member may reside at least partially between the flanges. In some embodiments, the first hoop member is compressible to facilitate assembly of the resilient member over the first hoop member.

In some embodiments, the wheel assembly may include a network of channels connecting hollow spaces between the protruding portions and another member. Other embodiments may comprise a valve stem in communication with the network of channels, and the vehicle wheel assembly may be configured such that introducing compressed gas into the valve stem distributes compressed gas to the hollow spaces between the protruding portions and the other member. In some embodiments, the network of channels may be formed in the resilient member. In some embodiments, the rim may further comprise a hub centered within the rim and configured for mounting to a vehicle. In some embodiments, the tying members may be molded into the resilient member. The peripheral portion of the rim may be substantially cylindrical. The peripheral portion may be crowned. The hoop member may be substantially cylindrical. The hoop member may be crowned.

In another embodiment, a method of constructing a vehicle wheel assembly may include obtaining a rim having a round peripheral portion and obtaining a hoop member having a round main portion that is larger than the peripheral portion of the rim. The hoop member may have a plurality of access openings in the main portion. The method also may include obtaining a resilient member, and disposing the resilient member around and in contact with an outside surface of the main portion of the hoop member, and obtaining a tying member for each opening in the main portion of the hoop member. At each opening in the hoop member main portion, a portion of the resilient member may protrude into or through the opening and toward the rim. And, the protruded portion may connect to the rim using one of the tying members. Each tying member may remain in tension when the wheel assembly is unloaded.

In some embodiments, the method also may include obtaining a round second hoop member and disposing it around an outside surface of the resilient member, and obtaining a round traction layer and disposing it around an outside surface of the second hoop member. In some embodiments, the method may include attaching a valve stem in communication with a network of channels between the resilient member and another member, and introducing compressed gas through the valve stem and into the network of channels, the compressed gas distending the resilient member into or through the access openings and thereby forming the protruding portions.

In another embodiment, a vehicle wheel assembly comprises first and second round hoop members. The first hoop member may be an inner hoop member and the second hoop member may be an outer hoop member. The assembly may further comprise a resilient member disposed between the inner and outer hoop members in contact with each of the inner and outer hoop members, and may comprise a rim having a round peripheral portion. Tying members may be disposed about the periphery of the substantially cylindrical peripheral portion of the rim. The rim may be suspended, by the tying members, within and spaced apart from the inner hoop member. The tying members may connect the peripheral portion of the rim to the resilient member through access openings in the inner hoop member.

In another embodiment, a wheel assembly comprises a generally cylindrical hoop member comprising a plurality of openings, and a resilient membrane disposed around the generally cylindrical hoop member. Portions of the resilient membrane protrude into or through the openings in the generally cylindrical hoop member. The wheel assembly further comprises a plurality of tying members, one tying member pulling each protruding portion of the resilient membrane into or through one of the openings in the generally cylindrical hoop member. The wheel assembly also comprises a central hub suspended by the tying members within the generally cylindrical hoop member, each tying member being in tension when the wheel assembly is unloaded. In some embodiments, the generally cylindrical hoop member is crowned. In some embodiments, the wheel assembly further comprises a rim attached to the central hub, and to which each tying member attaches.

DESCRIPTION

Figure 1A:
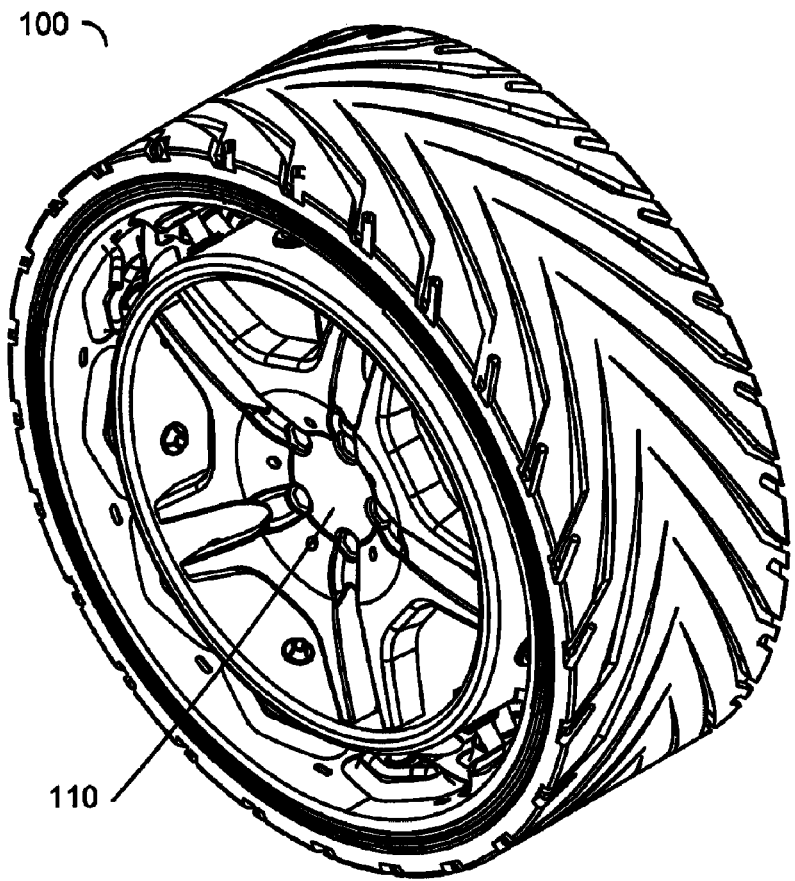
FIGS. 1A and 1B show a vehicle wheel assembly in accordance with one embodiment.
Figure 1B:
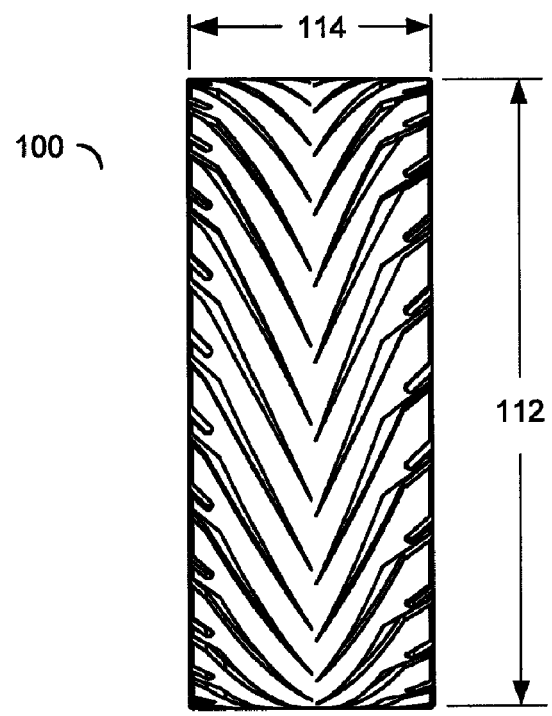

FIGS. 1A and 1B show a vehicle wheel assembly 100 in accordance with an example embodiment of the invention. Wheel assembly 100 is constructed in a manner that avoids the use of sidewalls, and therefore also avoids sidewall deformation. Wheel assembly 100 includes a hub 110 configured so that wheel assembly 100 can be mounted on a vehicle. Wheel assembly 100 may be produced in a variety of sizes for use on a variety of vehicles or other wheeled conveyances, for example, passenger cars, trucks, carts, vans, motorcycles, scooters, tractors, wheelbarrows, and other kinds of motorized or nonmotorized vehicles or conveyances. In one embodiment, wheel assembly 100 has a diameter 112 ranging from about 20 inches to about 36 inches, and a width 114 ranging from about six inches to about 15 inches. In a particular embodiment, diameter 112 is about 28 inches and width 114 is about 12 inches. One of skill in the art will recognize that many other dimensional combinations are within the scope of the claims, and that a wheel assembly such as wheel assembly 100 may be produced in different sizes to accommodate different vehicles and uses. Wheel assembly 100 is made up of several components, which will be described in conjunction with additional figures.

Figure 2:
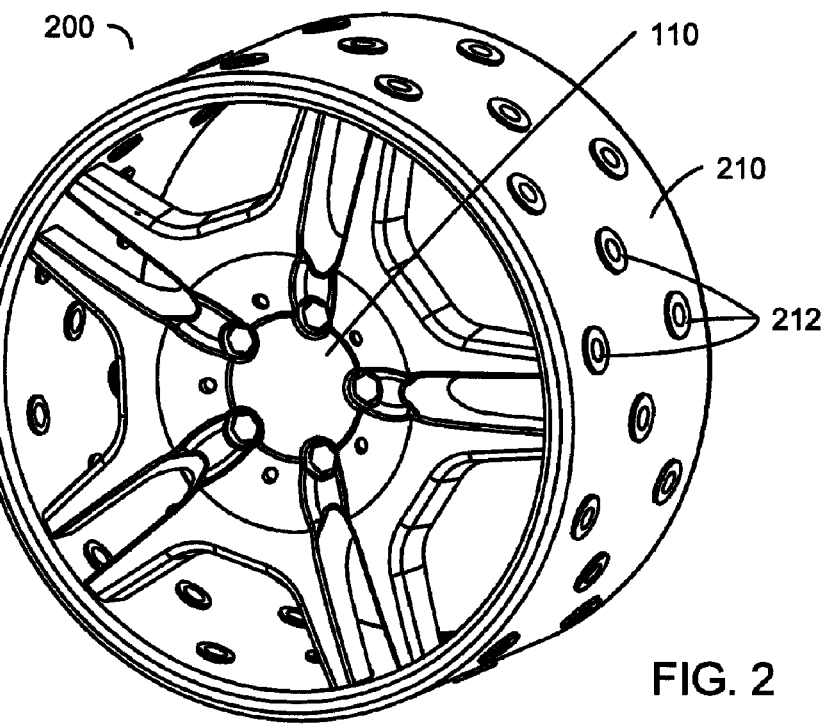
FIG. 2 shows a rim that is part of a wheel assembly, in accordance with one embodiment.

FIG. 2 shows a rim 200 that may be part of wheel assembly 100, in accordance with one embodiment. In FIG. 2, rim 200 comprises hub 110, and also comprises a round peripheral portion 210. In this example, peripheral portion 210 is substantially cylindrical. It should be understood that the term "substantially cylindrical" is used so as to allow imperfect cylinders to be included with the described subject matter since most manufacturers will include some imperfections from a perfect cylinder, and to encompass shapes that depart somewhat from perfectly cylindrical shapes, for example to include attachment features, crowning, and the like. In other embodiments, peripheral portion 210 may be curved or crowned. In one preferred embodiment, rim 200 is made of cast aluminum with some surfaces machined so as to maintain certain manufacturing tolerances, but other materials and processes may be used to produce a rim in accordance with embodiments of the invention. For example, rim 200 may be made of cast iron, may be assembled from sheet steel, may be molded from a polymer with or without reinforcing additives, may be made of an alloy of metals, may be made of a composite such as a fiber reinforced composite, or may be made using other materials or processes. Rim 200 may be made using combinations of materials and processes. Peripheral portion 210 may have a uniform thickness, may include draft to facilitate casting or molding, may include features such as bosses 212 that facilitate assembly of wheel assembly 100, or may include any combination of these and other features.

Figure 3:
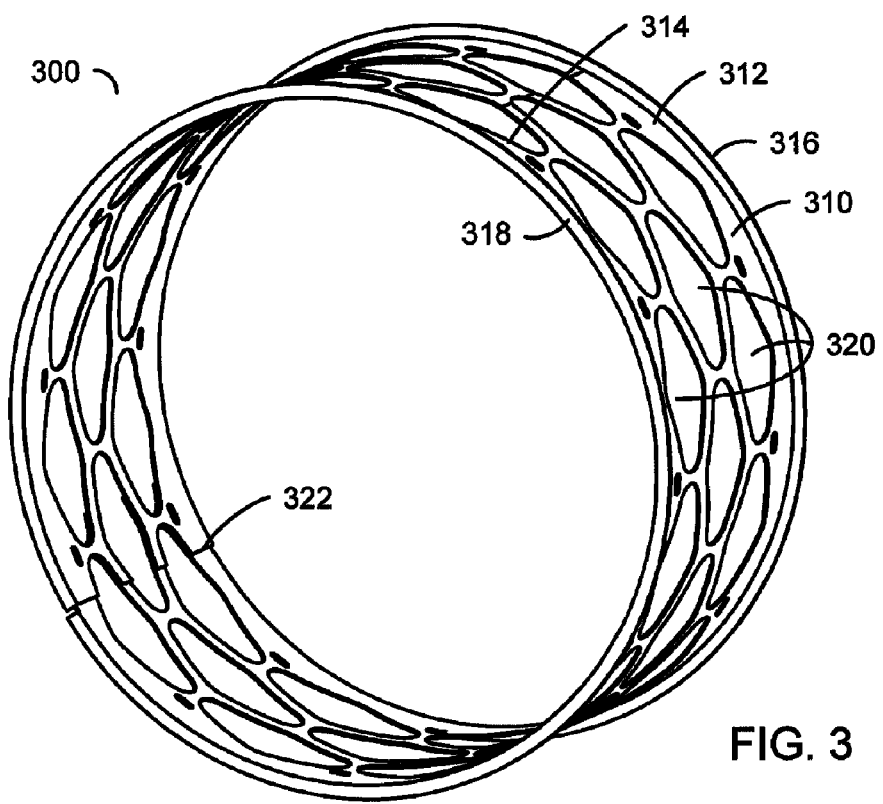
FIG. 3 shows a hoop member, in accordance with one embodiment.
Figure 4:
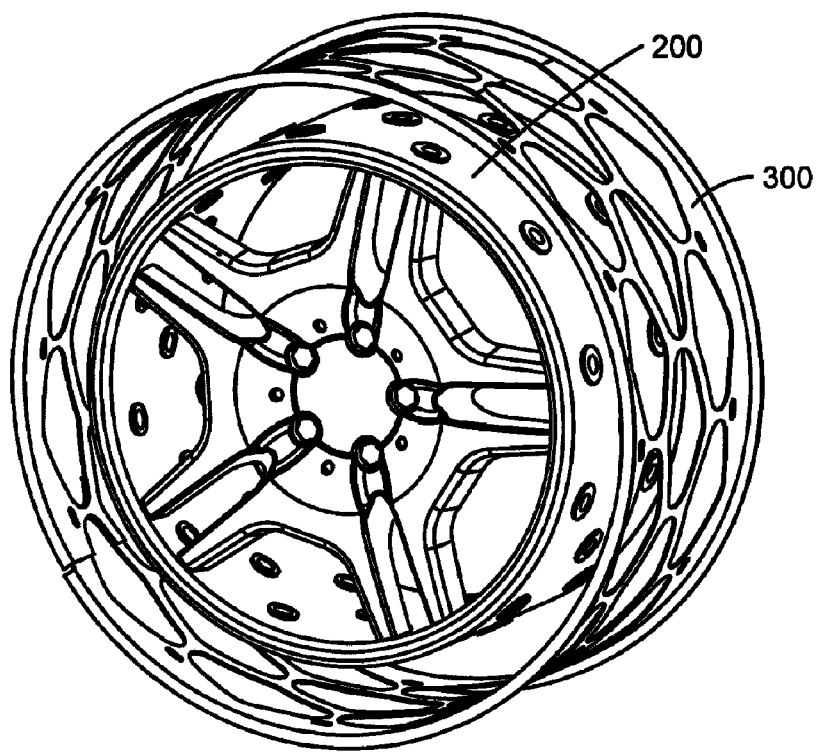
FIG. 4 shows a stage in the assembly of a wheel assembly, in accordance with one embodiment.

FIG. 3 shows a hoop member 300, in accordance with one embodiment. (In some embodiments, a second hoop member may be present, and hoop member 300 is a first hoop member.) Hoop member 300 has a round main portion 310 bounded by edges 312 and 314. In this example, main portion 310 is substantially cylindrical. Example hoop member 300 also comprises flanges 316 and 318 extending outward from edges 312 and 314. The main portion 310 has a plurality of access openings 320 disposed about its circumference. The purpose of access openings 320 will be explained below. Preferably, the edges of the access openings are deburred, beveled, or rounded so as to reduce stress concentrations in material that may come into contact with the edges later in the assembly of wheel assembly 100. While access openings 320 are shown as diamond-shaped, other shapes may be used. For example, access openings 320 may be of some other polygonal shape, or may be round, elliptical, or have some other curved outline. Access openings 320 need not all have the same shape. The diameter of hoop member 300 is somewhat larger than the diameter of rim 200, so that member 300 can be disposed around rim 300 and remain spaced apart from rim 200. This arrangement is shown in FIG. 4. Example hoop 300 also comprises a split 322. Split 322 allows hoop 300 to be compressed, reducing its diameter temporarily to enable further assembly of wheel assembly 100. First hoop member 300 may be made of any suitable material strong enough for the application in which wheel assembly 100 will be used, including cast aluminum, sheet aluminum, sheet steel, a molded or formed polymer, a composite, or another kind of material. In one embodiment, first hoop member 300 is made of sheet steel about 0.050 to about 0.500 inches thick. While example hoop member 300 is shown having three rows of 12 access openings 320 per row, with the middle row angularly offset from the outer two rows, other configurations are possible. More or fewer access openings 320 may be provided, in more or fewer rows, or in any desired arrangement depending on the performance requirements and application for which a particular wheel assembly is intended.

Figure 5A:
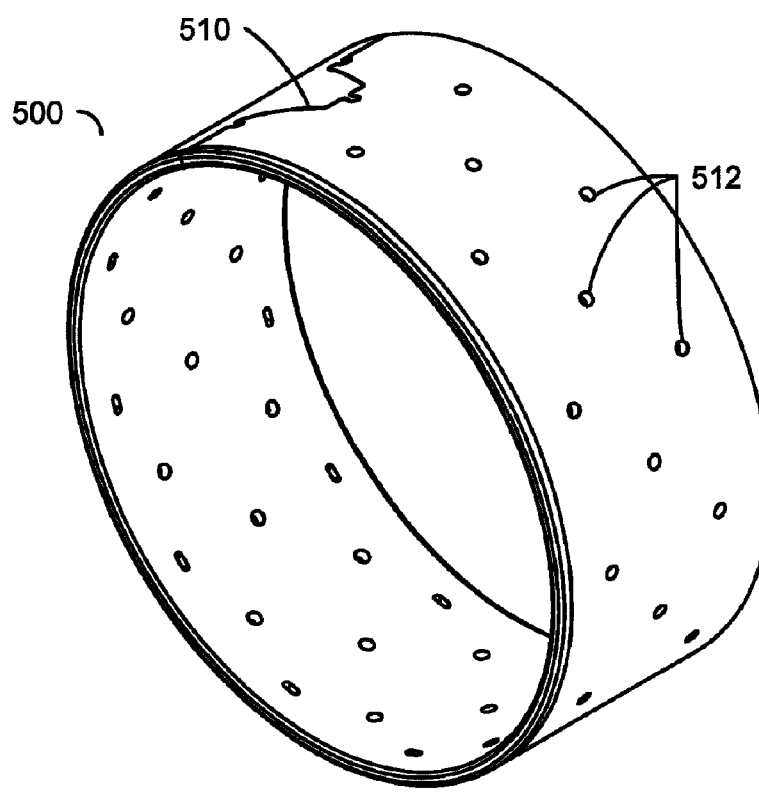
FIG. 5A shows a resilient member, in accordance with one embodiment.

FIG. 5A shows a resilient member 500, in accordance with one embodiment. Resilient member 500 can be made of a highly elastic polymer, such as a natural or synthetic molded rubber, or may be made of another flexible material, such as a metal alloy having good energy return characteristics. Many materials are possible. In one embodiment, resilient member 500 is made of natural gum rubber. In other embodiments, resilient member may be made of a natural or synthetic elastomer impregnated with a filler, such as carbon nanotubes. Resilient member 500 may be formed as a monolithic piece, or fabricated in a strip and joined at a joint such as joint 510 shown in FIG. 5A. In some embodiments, resilient member 500 may have a thickness of about 0.125 to about 1.500 inches. In some embodiments, resilient member 500 may have a plurality of attachment holes 512 that are substantially centered on access openings 320 in first hoop member 300 in a later assembly step. Resilient member 500 may sometimes be referred to as a "membrane."

Figure 5B:
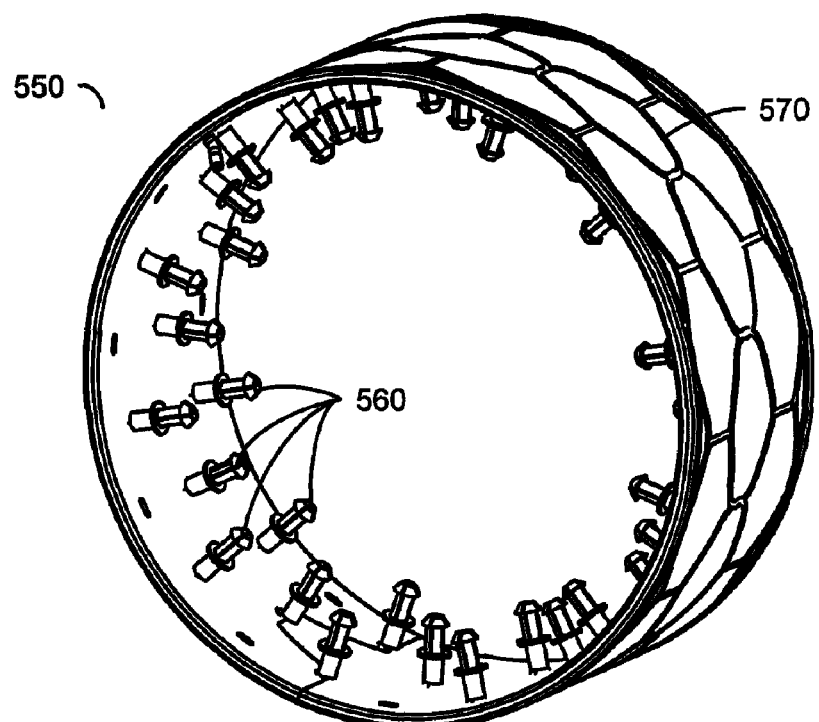
FIG. 5B shows a resilient member, in accordance with another embodiment.
Figure 6:
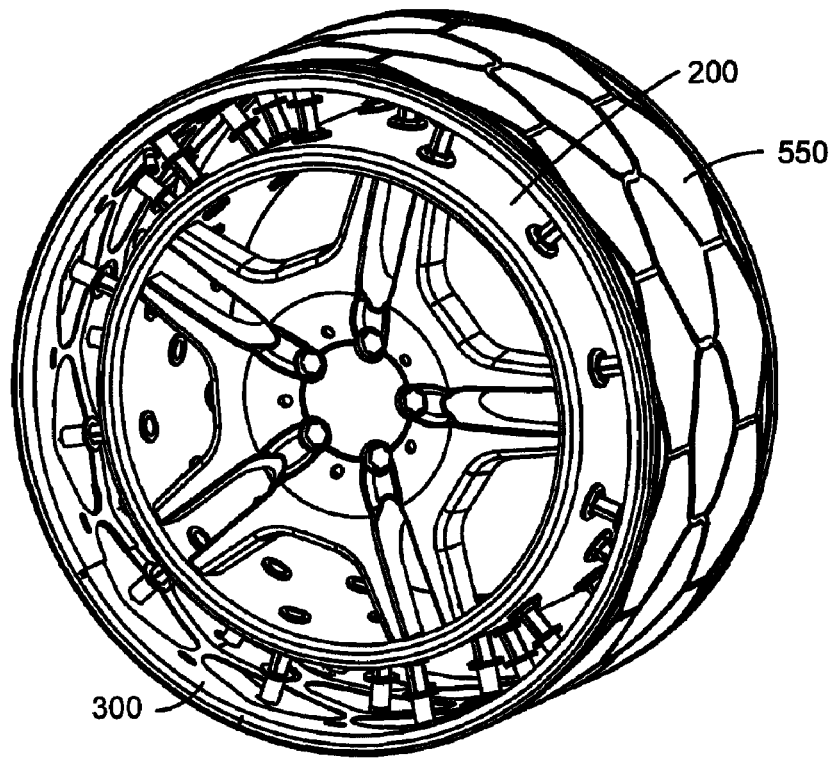
FIG. 6 shows another stage in the assembly of a wheel assembly, in accordance with one embodiment.

FIG. 5B shows a resilient layer 550 in accordance with another embodiment. In this embodiment, a plurality of tying members 560 are molded into resilient layer 550. The function of tying members 560 and channels 570 will be explained below. Other features may be molded into a resilient member such as resilient member 500 or resilient member 550 as well. For example, features for engaging with tying members 560, assembly reference features, or other features may be included, and such features may protrude into or through access openings 320 when the resilient member is in its initial relaxed state. Resilient member 500 or 550 is disposed around and in contact with the outside surface of the main portion of hoop member 300. If hoop member 300 has flanges such as flanges 316 and 318, then resilient member 500 may reside at least partially between the flanges. This arrangement is shown in FIG. 6. As an alternative to molding tying members 560 into the resilient layer, tying members may be inserted into attachment holes 512 of a resilient layer such as example resilient layer 500 shown in FIG. 5A. Many arrangements are possible. While example resilient member 500 is shown as originally having a uniform thickness, this is not a requirement. For example, features may be molded or otherwise formed in resilient member for receiving the tying members. The features may include portions raised from the outer surface of resilient member 500, features raised on the inside surface of resilient member 500, or both.

Figure 7:
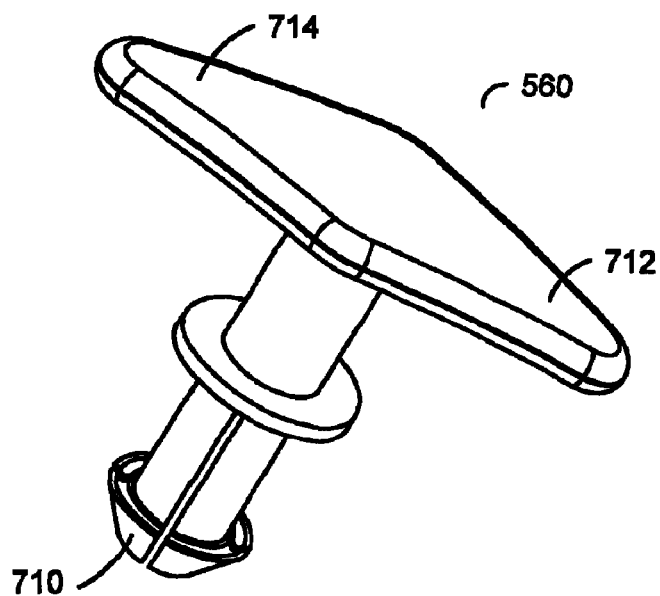
FIG. 7 shows a tying member, in accordance with one embodiment.

FIG. 7 shows a tying member 560, in accordance with one embodiment. Tying member 560 comprises a first attachment at a first end 710 for engaging rim 200. In the example of FIG. 7, the attachment is a snap that is configured to snap into a hole in the peripheral portion 210 of rim 200, but other attachment methods could be used. For example, tying member 560 could include a threaded end that is configured to thread into a threaded hole in rim 200, or tying member 560 could be threaded and protrude through a hole in rim 200 and be affixed by a nut. Many other attachment methods are possible. At a second end 712, tying member 560 comprises a flange 714 for engaging resilient member 500. Flange 714 may be large enough to avoid pulling through resilient member 500, and have rounded edges to avoid stress concentrations. While example flange 714 is shown as diamond shaped, other shapes may be used, including round, elliptical, or other curved or polygonal shapes. Tying member 560 may be made of any suitable material, such as aluminum, steel, or another metal, or a polymer such as polycarbonate, nylon, or other suitable materials. One tying member 560 may be provided for each access opening in hoop member 300. (One of skill in the art will recognize that the assembly of wheel assembly 100 may proceed in a different order than is being described. For example, it may be preferable to position hoop member 300, resilient member 500, and tying members 560 with each other, and then place rim 200 inside that subassembly. Other assembly orders are possible.)

Figure 8:
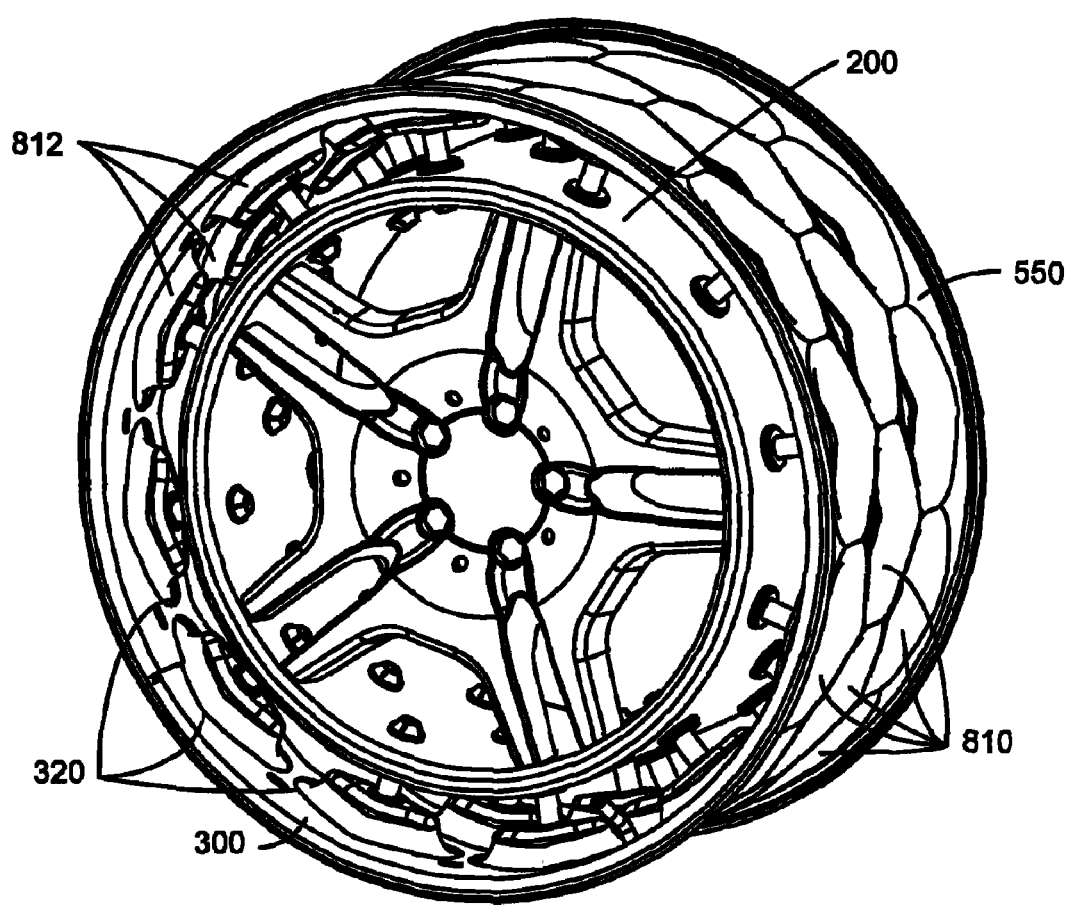
FIG. 8 shows another stage in the assembly of a wheel assembly, in accordance with one embodiment.

With rim 200, hoop member 300, resilient member 500, and tying members 560 in position, tying members 560 may be urged toward rim 200 and engage with rim 200. This arrangement is shown in FIG. 8. After engagement, each tying member flange 714 is then contained in a recess 810 and is submerged below the outer surface of resilient member 500. Each tying member causes a portion 812 of resilient member 500 to protrude into or through one of the access openings 320 in hoop member 300. In other embodiments, as will be explained in more detail below, features molded or formed into resilient member 500 may protrude to some degree into or through access openings 320 even before tying members 560 are engaged with rim 200, but the engagement of tying members 560 with rim 200 causes further protrusion or extension of resilient member 500. It will be appreciated that in this unloaded condition, each tying member 560 is in tension, and rim 200 is suspended, substantially centered in the assembly, by tying members 560. The urging of tying members 560 to engagement with rim 200 may be accomplished by a press, by special tooling, by the novel method described below, or by any other suitable method.

Figure 9:
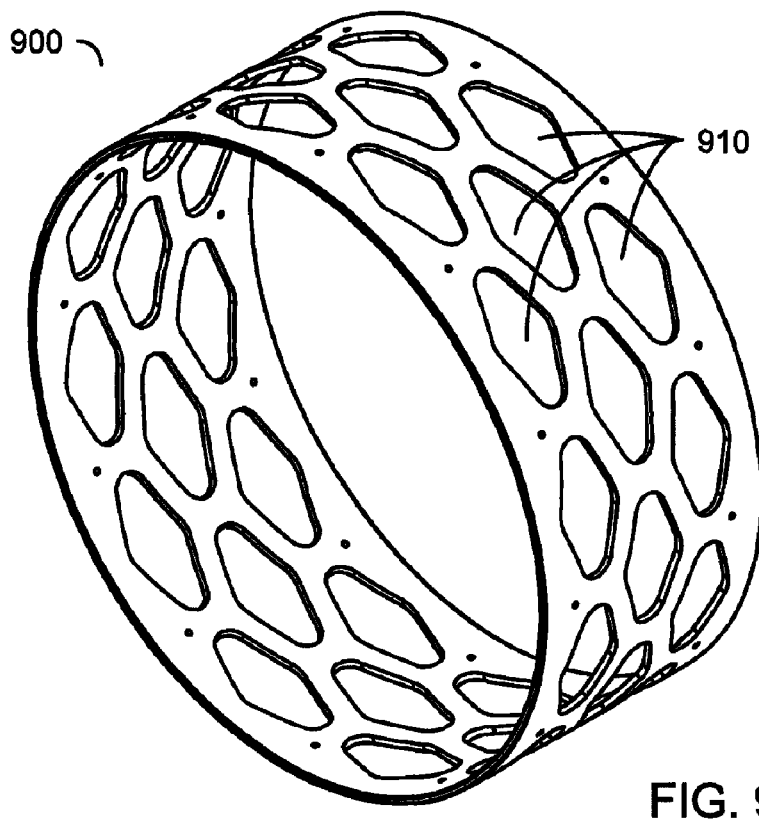
FIG. 9 shows a second hoop member, in accordance with one embodiment.
Figure 10:
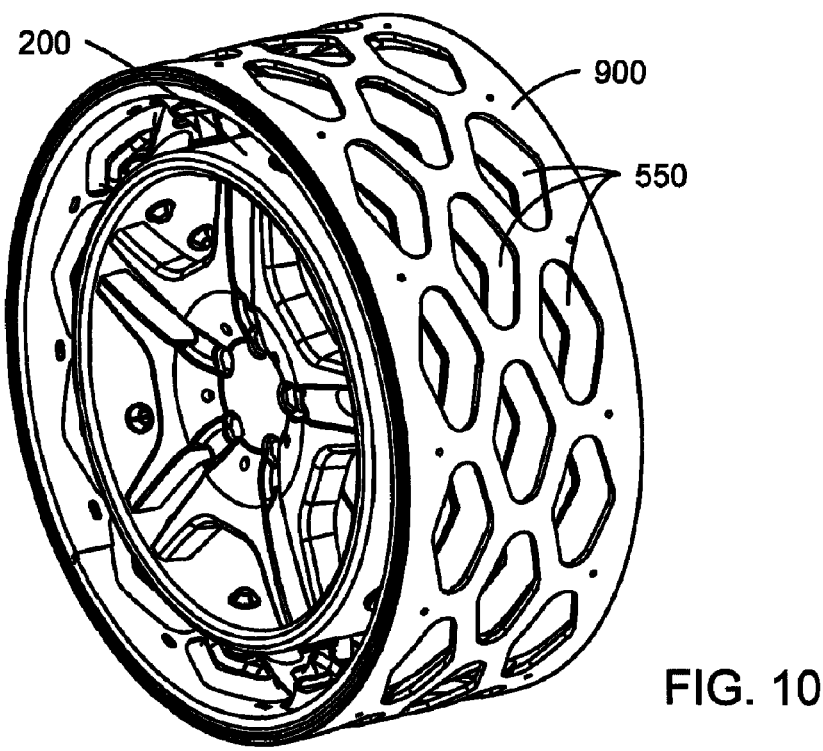
FIG. 10 shows another stage in the assembly of a wheel assembly, in accordance with one embodiment.

FIG. 9 shows a second hoop member 900, in accordance with one embodiment. Second hoop member 900 is round, and sized to fit around the outside of resilient member 500. Second hoop member 900 is substantially cylindrical in this embodiment. Second hoop member 900 may sometimes be called an actuator. Hoop member 900 may be made of any suitable material, including aluminum, steel, a polymer, a composite, or another kind of material. In one embodiment, second hoop member 900 is made of sheet steel about 0.050 to about 0.500 inches thick. Second hoop member 900 may optionally have access holes 910 that may provide access to tying members 560 for assembly, depending on the kinds of fasteners used with tying members 560. Preferably, access holes 910 align radially with access openings 320 in first hoop member 300. Access holes 910 may be diamond shaped, as shown, or may have any of a variety of other shapes, and need not all be of the same shape. Second hoop member 900 is disposed around the outside surface of resilient member 500. This arrangement is shown in FIG. 10.

Figure 11:
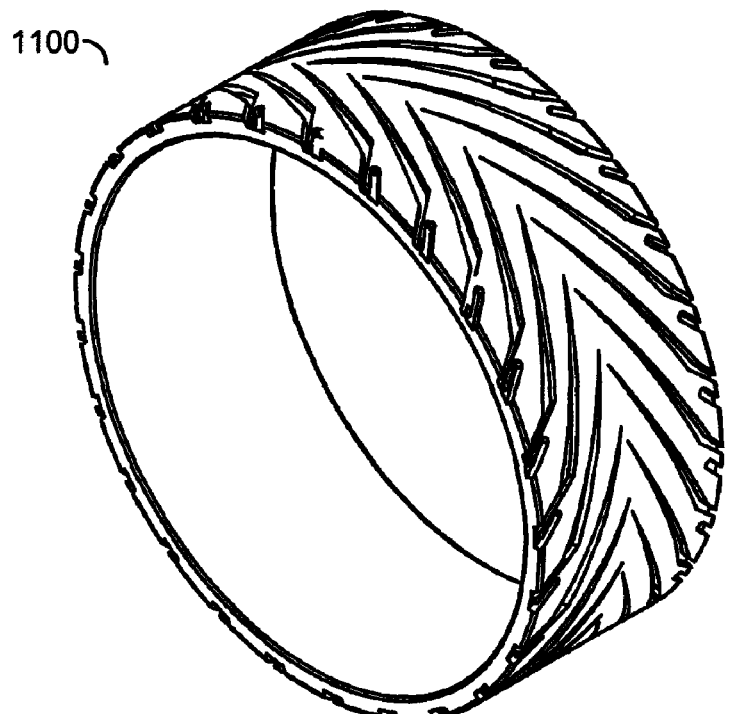
FIG. 11 shows a traction layer, in accordance with one embodiment.

FIG. 11 shows a traction layer 1100, in accordance with an example embodiment of the invention. Traction layer 1100 is preferably made of a hard, durable rubber or other semiflexible material. In one embodiment, traction layer 1100 is made of tire rubber. In another embodiment, traction layer 1100 may be impregnated with a filler, for example carbon nanotubes. Traction layer 1100 may include various fillers or reinforcing agents or structures. Traction layer 1100 is shown with a particular tread pattern, but one of skill in the art will recognize that other tread patterns may be used, or traction layer 1100 may be formed without a tread pattern. Traction layer 1100 is disposed around second hoop member 900 to complete the assembly of wheel assembly 100, shown in FIG. 1. In some embodiments, traction layer 1100 may have a thickness of about 0.25 to about 1.50 inches. While example traction layer has been shown as having uniform thickness (other than the tread pattern), this is not a requirement. For example, the center of traction layer 1100 may be made thicker than the edges.

While second hoop member 900 and traction layer 1100 are depicted as separate items and described as separately assembled into wheel assembly 100, it is intended that the claims encompass the case where second hoop member 900 and traction layer 1100 are formed together as a subassembly and then disposed around resilient member 500. For example, second hoop member 900 may be insert molded into traction layer 1100 to form a subassembly that is then affixed to resilient member 500.

Second hoop member 900 and traction layer 1100, either separately or together, may be fixed into wheel assembly 100 using adhesives, chemical bonding, heat welding, lamination, stitching, solvent bonding, or any other suitable attachment method.

Figure 12:
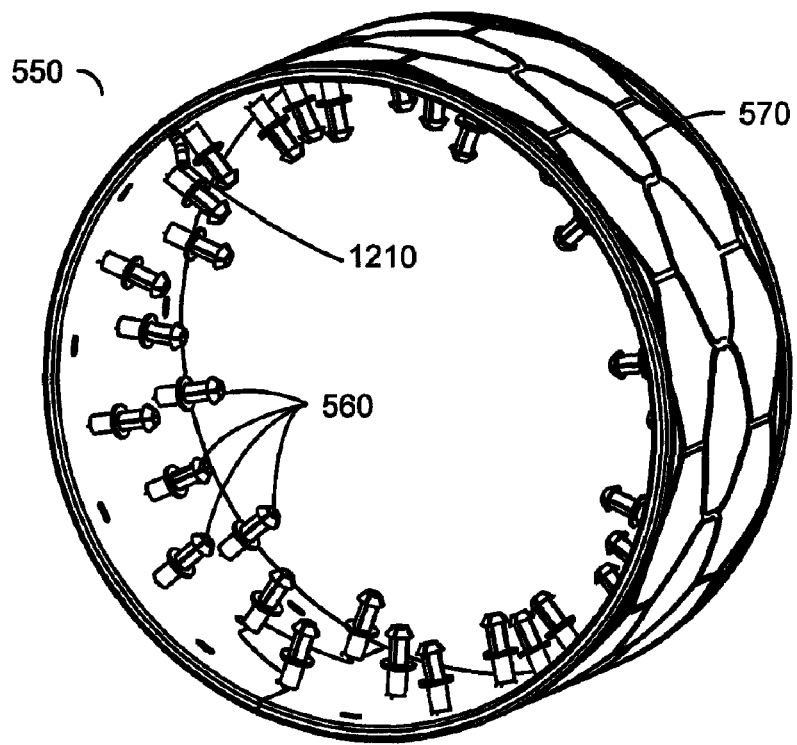
FIG. 12 shows a resilient member, in accordance with one embodiment.

FIG. 12 shows resilient member 550, in accordance with another example embodiment. Resilient member 550 comprises a network of channels 570 in its outer surface. The channels provide a pathway interconnecting the hollow spaces formed between recesses 810 and second hoop member 900 or traction layer 1100. In a wheel assembly using this resilient member embodiment, access holes (such as access holes 910 shown in FIG. 9) may not be provided in the second hoop member. A valve stem 1210 may be affixed to resilient member 900, configured to admit air or another gas to the network of channels. Valve stem 1210 may comprise a Schrader valve, or another kind of air valve. This arrangement is useful during the assembly of wheel assembly 100 to urge portions of resilient member 550 to protrude through access openings 320, thereby engaging tying members 560 with rim 200 for attachment. Preferably, in order to use this assembly method, resilient member 550 is hermetically sealed at its edges to second hoop member 900 or traction layer 1100. After assembly, the network of channels and recesses 810 may be left in their pressurized state, the pressure may be relieved, or the channels and recesses may be evacuated. While channels 570 are shown in a particular configuration in FIG. 12, one of skill in the art will recognize that many other configurations are possible. For example, the channels may be formed in a geometric or other pattern that places the channels over openings 320 in first hoop member 300.

Figure 13:
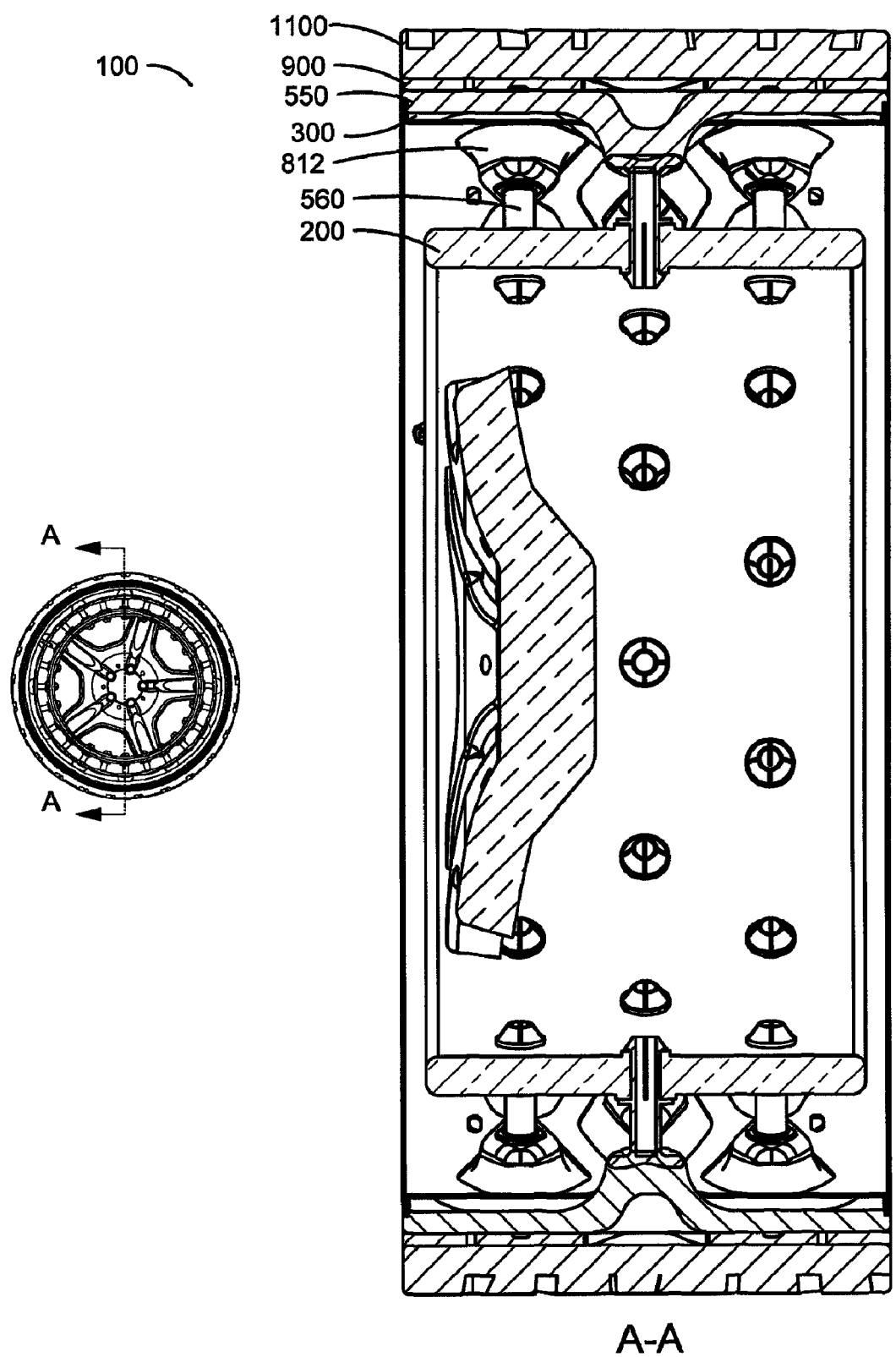
FIG. 13 shows a cross section of the example wheel assembly of FIG. 1 in its assembled state.

FIG. 13 shows a cross section of wheel assembly 100 in its assembled state. As is shown in FIG. 13, first hoop member 300 surrounds rim 200. Resilient member 550 surrounds and is in contact with first hoop member 300. Tying members 560 connect resilient member 550 to rim 200, pulling protruding portions 812 through openings in hoop member 300. Second hoop member (actuator) 900 surrounds resilient member 550, and is in turn surrounded by traction layer 1100.

Figure 14:
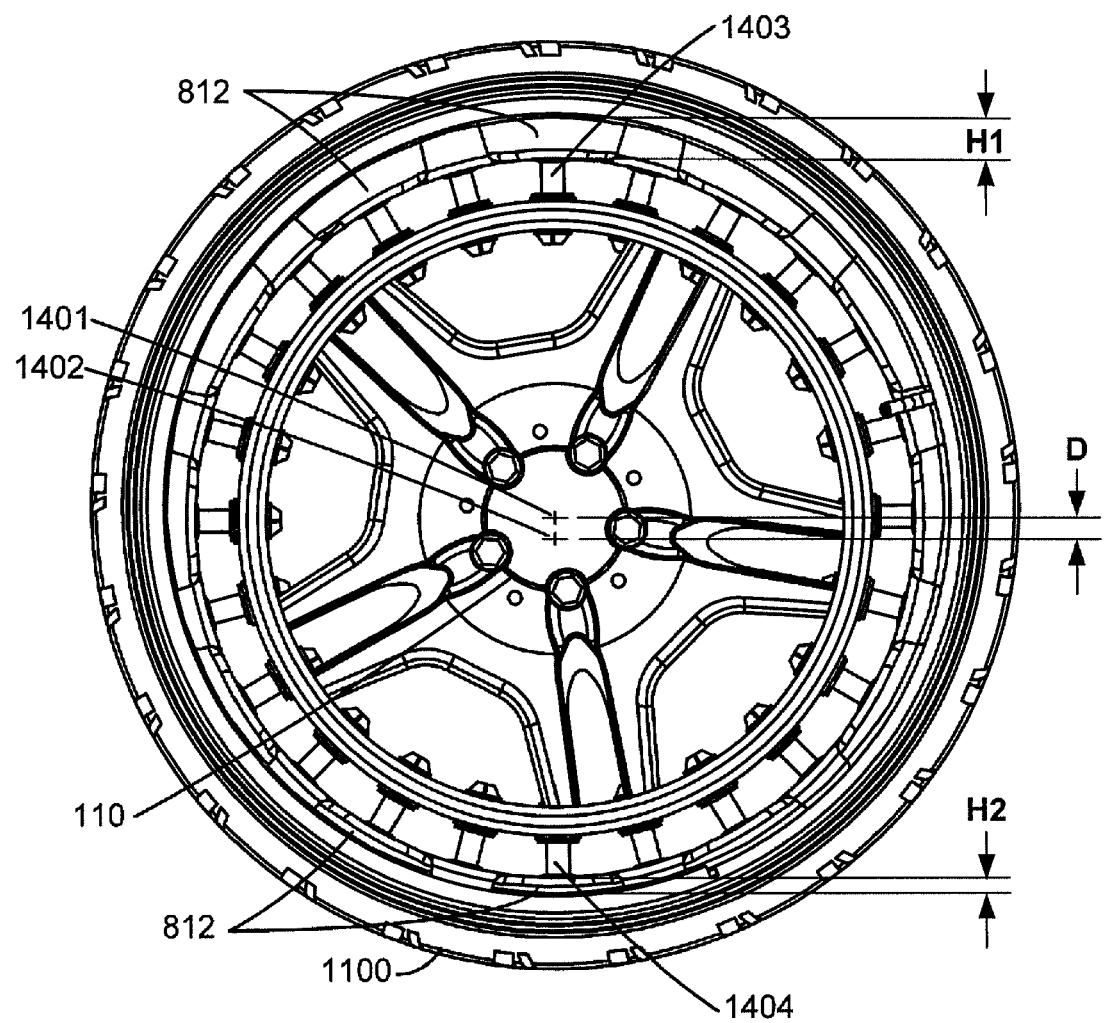
FIG. 14 shows a side view of the example wheel assembly of FIG. 1 in a loaded condition.

FIG. 14 shows a side view of example wheel assembly 100 in a loaded condition, for example after it has been mounted on a vehicle (not shown) and is supporting at least a portion of the vehicle's weight. Center point 1401 shows the location of the center of the circle formed by the circumference of traction layer 1100. Center point 1402 shows the location of the center of hub 110. Center point 1402 has been displaced downward from center point 1401 by the distance D. This displacement can also be seen in the variation in the apparent heights of protruding portions 812. At the top of wheel assembly 100, protruding portions 812 protrude by a distance of about H1, while at the bottom of wheel assembly 100, protruding portions 812 protrude by only a distance of about H2, which is smaller than H1. The weight of the vehicle has displaced hub 110 downward, and resilient member 500 has limited the displacement D by virtue of its elastic resistance to deformation. Hub 110 may be thought of as hanging from the top of wheel assembly 100, rather than being pushed up from the bottom of the wheel assembly. This overall compliance of wheel assembly 100 provides a cushioning capability so that wheel assembly 100 can absorb bumps and other road irregularities.

In FIG. 14, particular tying member 1403, near the top of wheel assembly 100, has displaced its corresponding protruding portion 812 such that it protrudes by a distance of about H1. The protruding portion corresponding to particular tying member 1404, near the bottom of wheel assembly 100, protrudes by only about a distance H2. After wheel assembly has rolled one half revolution clockwise, for example if the vehicle on which wheel assembly 100 is mounted moves to the right, particular tying member 1404 will be near the top of wheel assembly 100, and will distend its corresponding protruding portion so that it protrudes by a distance of about H1. Correspondingly, particular tying member 1403 will be near the bottom of wheel assembly 100, and its corresponding protruding portion will protrude by a distance of only about H2. During rolling of wheel assembly 100, the various tying members will thus by turns reach the top of wheel assembly 100, where they bear the largest portion of the weight of the vehicle, and will by turns reach the bottom of wheel assembly 100.

Figure 15:
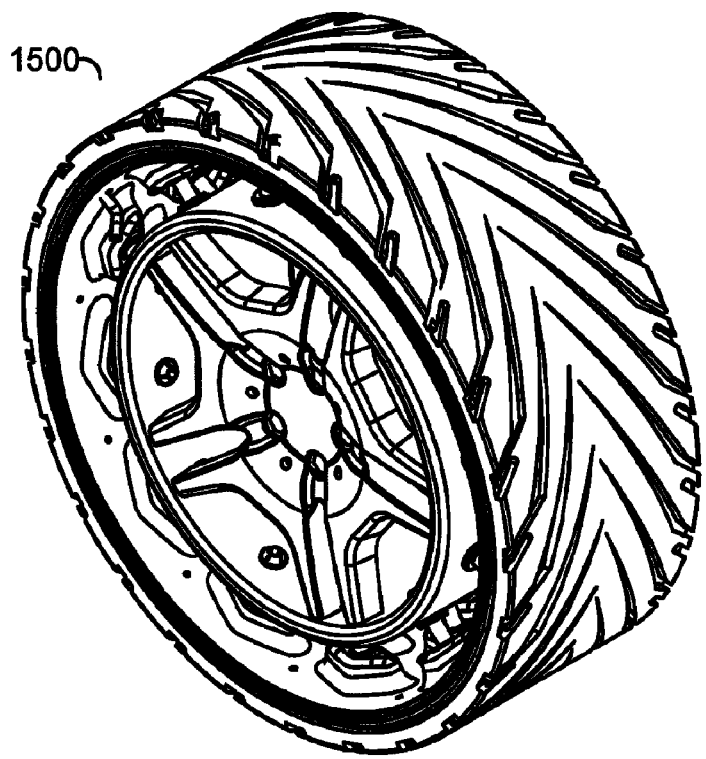
FIG. 15 shows a wheel assembly in accordance with another embodiment.

FIGS. 15-18 show the assembly of another embodiment. FIG. 15 shows a completed wheel assembly 1500 in accordance with this embodiment. Wheel assembly 1500 may comprise fewer parts than wheel assembly 100, and its fabrication may be somewhat simplified.

Figure 16:
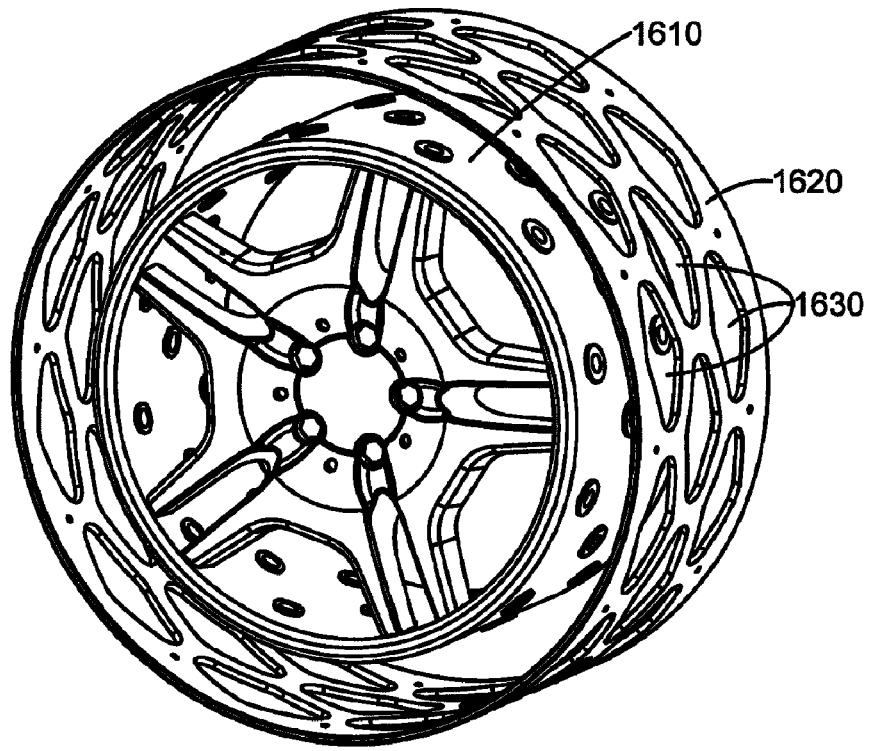
FIG. 16 shows a stage in the assembly of the wheel assembly of FIG. 15, in accordance with one embodiment.

FIG. 16 shows some parts of wheel assembly 1500 in a partially assembled state. Rim 1610, which may be similar to rim 200, is surrounded by a hoop member, also called a single actuator, 1620, which may be similar to second hoop member or actuator 900, but may be somewhat thicker. Hoop member 1620 may be made of any suitable material, including for example aluminum, steel, a polymer, a composite, or another kind of material. In one embodiment, hoop member 1620 is made of sheet steel about 0.050 to about 0.750 inches thick, although thicknesses outside this range are also possible. Preferably, hoop member 1620 includes access openings 1630 for connecting a resilient member to rim 1610.

Figure 17:
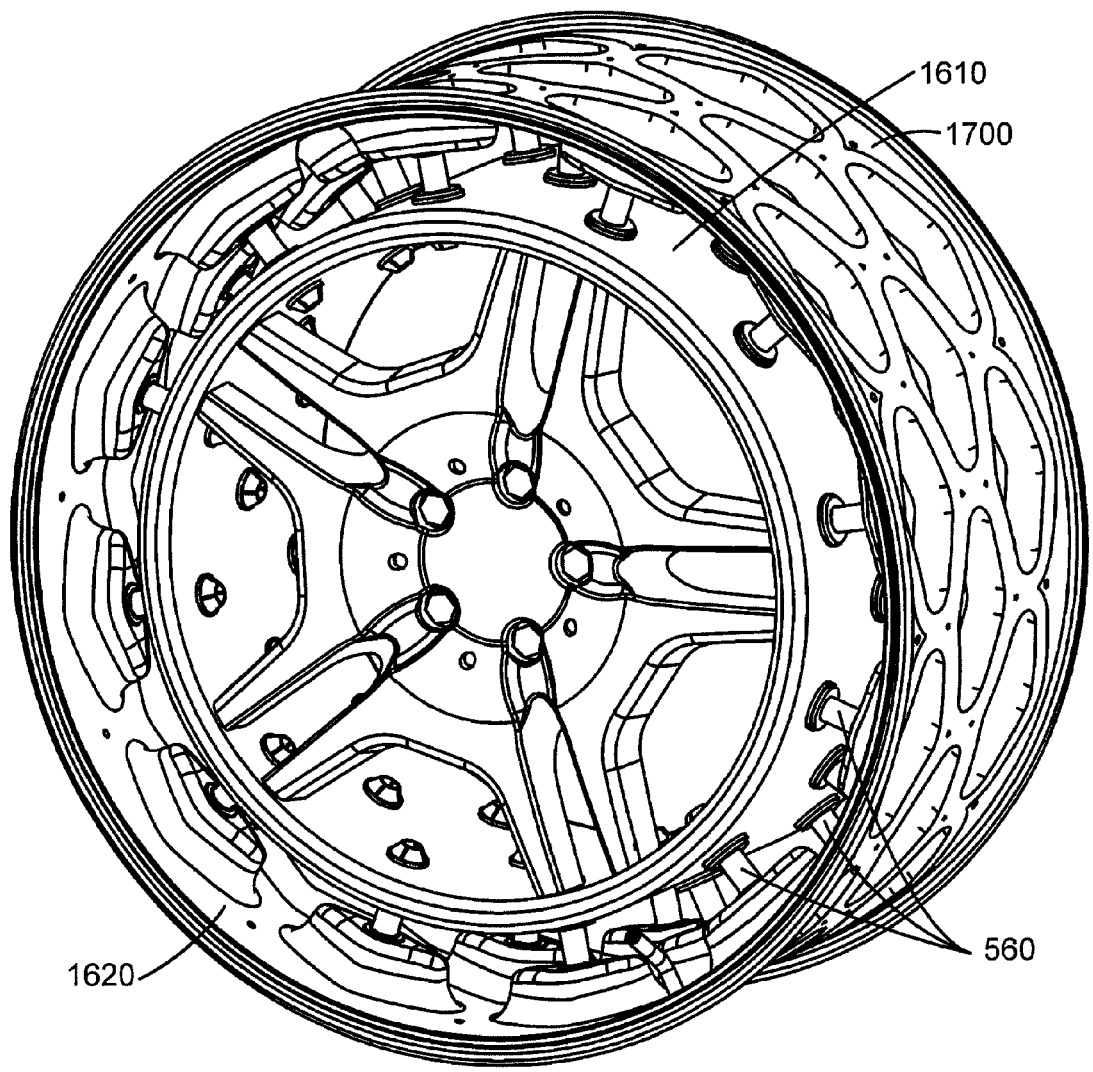
FIG. 17 shows a stage in the assembly of the wheel assembly of FIG. 15, in accordance with one embodiment.

FIG. 17 shows another stage in the assembly of wheel assembly 1500. In FIG. 17, a resilient member 1700 has been placed over hoop member 1620, and tying members 560 have been engaged with rim 1610. In some embodiments, the outer surface of resilient member 1700 may also be a traction surface for the wheel assembly. In that case, assembly is substantially complete at this stage. Resilient member 1700 may be configured with a tread pattern on its outer surface, using any suitable pattern.

In other embodiments, a traction layer may be affixed around the outer surface of resilient member 1700. Using two separate pieces may allow, for example, for resilient member 1700 and the traction layer to have different elastic and wear properties. The two pieces may be affixed together by any suitable means, including solvent bonding, chemical bonding, an adhesive, thermal welding, stitching, or another means. When a separate traction layer is used, resilient member 1700 may include a valve and channels for distributing compressed air or other gas from the valve to hollow spaces behind tying members 560. This technique may facilitate assembly of wheel assembly 1500 by urging tying members 560 toward rim 1610. Once assembly is complete, the hollow spaces may be left pressurized, the pressure may be relieved, or the hollow spaces may be evacuated.

Figure 18:
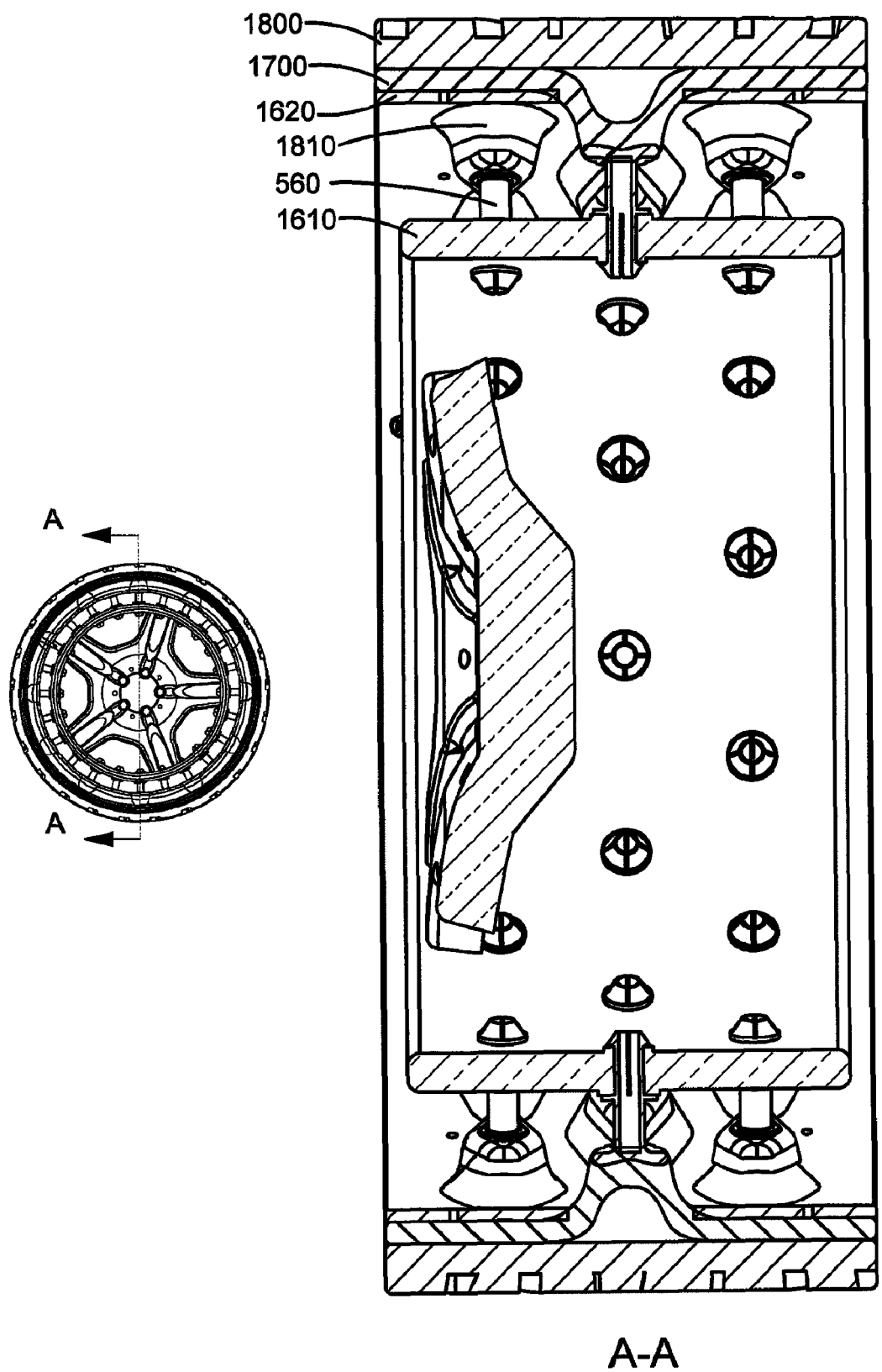
FIG. 18 shows a cross section of the wheel assembly of FIG. 15 in its assembled state.

FIG. 18 shows a cross section view of wheel assembly 1500 in its assembled state, according to an embodiment. Hoop member 1620 surrounds rim 1610. Resilient member 1700 surrounds and is in contact with hoop member 1620. Tying members 560 connect resilient member 1700 to rim 1610, pulling protruding portions 1810 through openings in hoop member 1620. In this embodiment, a traction layer 1800 surrounds resilient member 1700.

Figure 19:
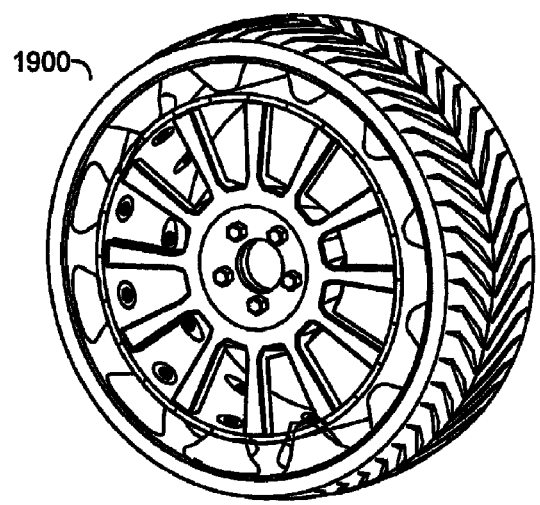
FIG. 19 shows a wheel assembly in accordance with another embodiment.
Figure 20:
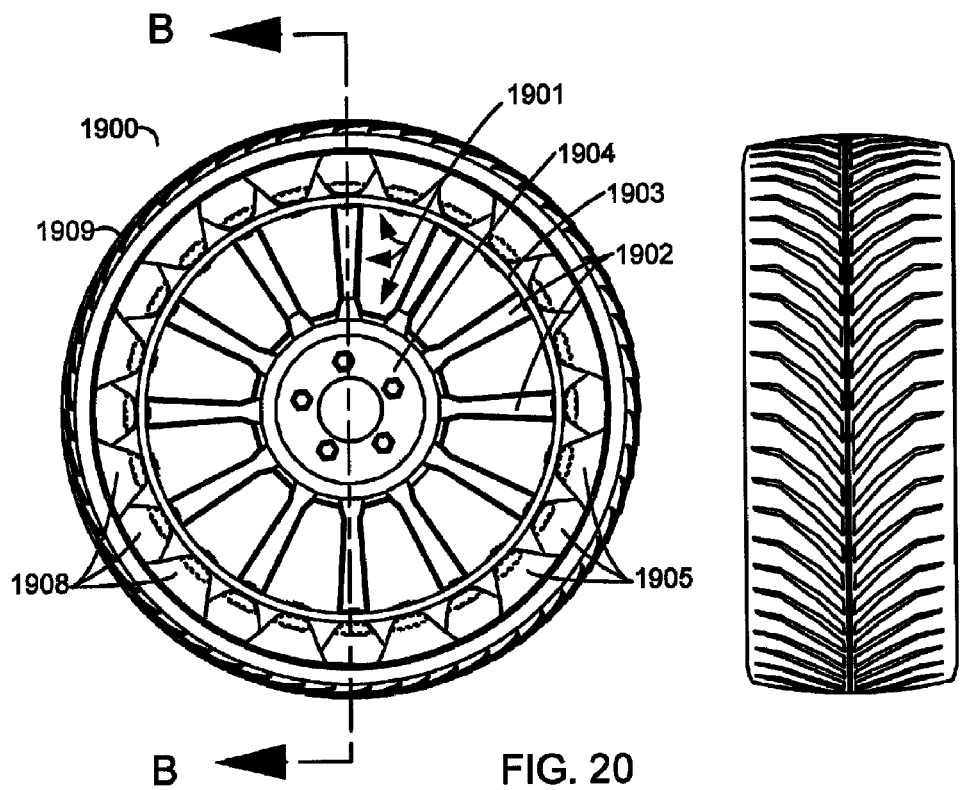
FIG. 20 shows orthogonal views of the wheel assembly of FIG. 19.
Figure 21:
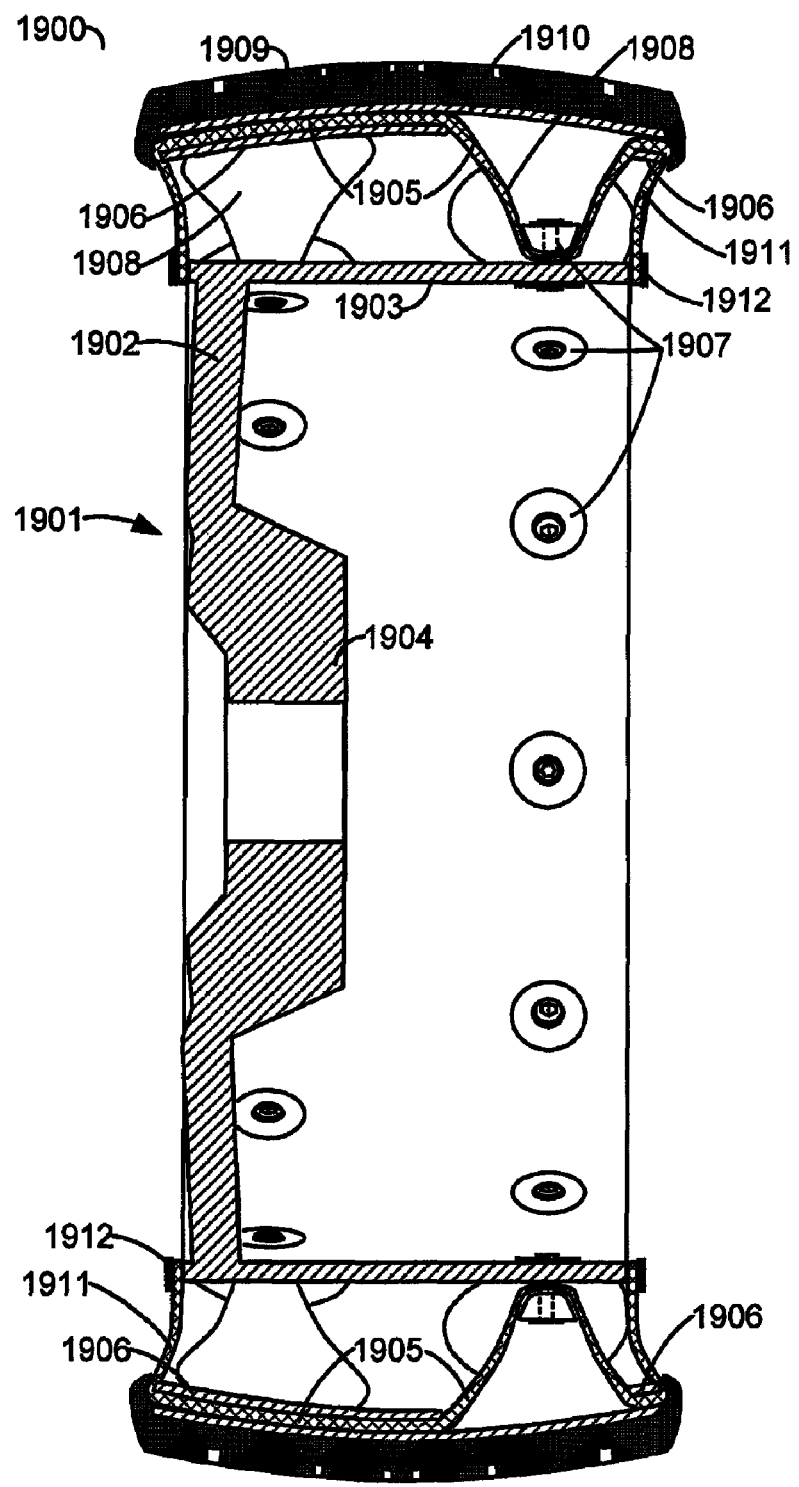
FIG. 21 shows a cross section view of the wheel assembly of FIG. 19.

FIGS. 19-21 show a wheel assembly 1900 in accordance with another embodiment. In this embodiment, rim 1901 comprises a number of spoke-like features 1902 connecting a peripheral portion 1903 with a central hub 1904. As compared with the example rim 200 shown in FIG. 2, rim 1901 comprises a greater number of spoke-like features 1902 that are thinner than the corresponding features of rim 200, and hub 1904 is of a smaller diameter than the corresponding feature of rim 200. This arrangement may enable more of the mass of the rim to reside closer to the axis of rotation, so that the rim has a lower rotational moment of inertia, enabling better acceleration of a vehicle on which rim 1901 is used.

In example wheel assembly 1900, a resilient member 1905 protrudes through openings in a hoop member 1906, and each protrusion is connected with rim 1901 by a tying member 1907. Tying members 1907 are depicted as including a smooth nut drawn toward peripheral portion 1903 of rim 1901 by a screw, but other kinds of tying members may be used, including, for example, tying members 560 shown in FIG. 7. Hoop member 1906 may be made of any suitably strong material, for example a metal such as steel or aluminum, or a composite material such as a composite comprising carbon fibers. Protruding portions 1908 of resilient member 1905 may be formed in various ways. For example, resilient member 1905 may have a uniform thickness in its relaxed state, and the protruding portions 1908 formed when tying members 1907 are engaged with rim 1901. Alternatively, protruding portions 1908 may be molded or otherwise formed into resilient member 1905, so that in their relaxed state, they protrude some distance through hoop member but not as far as when tying members 1907 are engaged with rim 1901, so that the engagement of tying members 1907 with rim 1901 further elongates the protruding portions 1908, and leaves the tying members 1907 in tension after assembly.

In example wheel assembly 1900, two circumferential rows of tying members 1907 are used to connect resilient member 1905 to rim 1901, compared with three rows used in the embodiments previously described. Any suitable number of rows may be used, with any suitable number of tying members 1907 in each row. A traction layer 1909 is further disposed around hoop member 1906. FIG. 20 shows orthogonal views of wheel assembly 1900.

FIG. 21 shows a cross section view of example wheel assembly 1900. The cross section view clearly illustrates another feature of this embodiment. Hoop member 1906 is curved in cross section, so that hoop member 1906 and traction layer 1909 are crowned. Wheel assembly 1900 thus has a somewhat larger diameter at its center than at its edges. The degree of curvature of hoop member 1906 may be selected in accordance with the intended use of a particular wheel assembly. For example, in a wheel assembly for use on a large truck, little or no curvature or crowing may be provided. In a wheel assembly for use on a motorcycle, the curvature or crowing may be quite pronounced, so as to enable high maneuverability of the motorcycle. The peripheral portion of rim 1901 may also be curved or crowned in cooperation with the curvature or crowning of hoop member 1905.

Optionally, a relatively rigid outer hoop member 1910 may be positioned around the outside of resilient member 1905. Outer hoop member 1910 may be made of any suitably strong material, for example a metal such as steel or aluminum, or a composite material, such as a composite comprising carbon fibers. Outer hoop member 1910 may serve to support traction layer 1909 substantially uniformly, including over the openings in hoop member 1906, so as to discourage uneven wear of traction layer 1909.

Also optionally, a resilient sidewall 1911 (shown only in FIG. 21) may be provided. Preferably, sidewall 1911 is made of a material with a high elasticity, so that upon any deformation, sidewall 1911 can return to its original shape with minimal energy loss. Sidewall 1911 may be sealed to edge 1912 of rim 1901, thus preventing the buildup of dirt, mud, or debris within the space between rim 1901 and hoop member 1906. In some embodiments, sidewall 1911 and resilient member 1905 may be formed as a single piece. In some embodiments including sidewall 1911, the space between rim 1901 and hoop member 1906 may be at atmospheric pressure, or a pressure lower or higher than atmospheric pressure. Note, however, that even in an embodiment with positive pressure, rim 1901 is still suspended within the wheel assembly by resilient member 1905, so that the wheel assembly continues to function if pressure is lost for any reason.

A wheel assembly in accordance with some embodiments avoids the use of a sidewall, and therefore avoids energy dissipation in the deformation of a sidewall. It is also hoped that the unique dynamics of the wheel assembly will lead to further efficiency gains. Furthermore, the wheel assembly provides compliance for accommodating some road surface roughness without the requirement that a tire remain inflated. Thus, a common tire failure mode is avoided.

The invention has now been described in detail for the purposes of clarity and understanding. However, those skilled in the art will appreciate that certain changes and modifications may be practiced within the scope of the appended claims.

What is claimed is:

1. A wheel assembly, comprising:
   a round rim having a round peripheral portion;
   a round hoop member having a main portion, the hoop member being disposed around the rim and radially spaced apart from the rim, the main portion having a plurality of access openings;
   a resilient member disposed around and in contact with an outside surface of the main portion of the hoop member, portions of the resilient member protruding into or through the access openings in the hoop member and radially toward the rim;
   a plurality of tying members, each tying member connecting one protruding portion to the rim, each tying member being in tension when the wheel assembly is unloaded.

2. The wheel assembly of claim 1, wherein an outside surface of the resilient member is a traction surface of the wheel assembly.

3. The wheel assembly of claim 1, further comprising a traction layer disposed around an outside surface of the resilient member.

4. The wheel assembly of claim 1 wherein the hoop member is a first hoop member, and further comprising
   a round second hoop member disposed around an outside surface of the resilient member; and
   a traction layer disposed around an outside surface of the second hoop member.

5. The wheel assembly of claim 4, wherein the second hoop member has a plurality of access holes that substantially align radially with the access openings in the first hoop member.

6. The wheel assembly of claim 1, wherein the hoop member comprises first and second edges and a flange extending radially outward from each of the first and second edges, and wherein the resilient member resides at least partially between the flanges.

7. The wheel assembly of claim 1, wherein the hoop member is compressible to facilitate assembly of the resilient member over the hoop member.

8. The wheel assembly of claim 1, further comprising a network of channels connecting hollow spaces between the protruding portions and another member disposed around an outside surface of the resilient member.

9. The wheel assembly of claim 8, further comprising a valve stem in communication with the network of channels, the vehicle wheel assembly configured such that introducing compressed gas into the valve stem distributes compressed gas to the hollow spaces between the protruding portions and the other member disposed around the outside surface of the resilient member.

10. The wheel assembly of claim 8, wherein the network of channels is formed in the resilient member.

11. The wheel assembly of claim 1, wherein the rim further comprises a hub centered within the rim and configured for mounting to a vehicle.

12. The wheel assembly of claim 1, wherein the tying members are molded into the resilient member.

13. The wheel assembly of claim 1, wherein the peripheral portion is substantially cylindrical.

14. The wheel assembly of claim 1, wherein the peripheral portion is crowned.

15. The wheel assembly of claim 1, wherein the hoop member is substantially cylindrical.

16. The wheel assembly of claim 1, wherein the hoop member is crowned.

17. A method of constructing a wheel assembly, the method comprising:
   obtaining a round rim having a round peripheral portion;
   obtaining a round hoop member having a main portion that has a diameter larger than that of the peripheral portion of the rim, the hoop member having a plurality of access openings in the main portion;
   obtaining a resilient member, and disposing the resilient member around and in contact with an outside surface of the main portion of the hoop member;
   obtaining a tying member for each opening in the main portion of the hoop member;
   at each opening in the hoop member main portion, protruding a portion of the resilient member through the opening and radially toward the rim, and connecting the protruded portion to the rim using one of the tying members, each tying member remaining in tension when the wheel assembly is unloaded.

18. The method of claim 17 wherein the hoop member is a first hoop member, the method further comprising:
   obtaining a round second hoop member and disposing the round second hoop member around an outside surface of the resilient member; and
   obtaining a round traction layer and disposing the traction layer around an outside surface of the second hoop member.

19. The method of claim 17, further comprising:
   attaching a valve stem in communication with a network of channels between the resilient member and another member disposed around an outside surface of the resilient member; and
   introducing compressed gas through the valve stem and into the network of channels, the compressed gas distending the resilient member into or through the access openings.

20. A wheel assembly, comprising:
   first and second round hoop members, wherein the first round hoop member is an inner hoop member and the second round hoop member is an outer hoop member;
   a resilient member disposed between the inner and outer hoop members in contact with each of the inner and outer hoop members;
   a rim comprising a round peripheral portion; and
   tying members disposed about the periphery of the peripheral portion of the rim;
   wherein the rim is suspended within and radially spaced apart from the inner hoop member, wherein the tying members connect the peripheral portion of the rim to the resilient member through access openings in the inner hoop member, and wherein the rim is suspended by the tying members.

21. A wheel assembly, comprising:
   a generally cylindrical hoop member comprising a plurality of openings;
   a resilient membrane disposed around the generally cylindrical hoop member, portions of the resilient membrane protruding into or through the openings in the generally cylindrical hoop member;
   a plurality of tying members, one tying member pulling each protruding portion of the resilient membrane into or through one of the openings in the generally cylindrical hoop member; and
   a central hub suspended by the tying members within the generally cylindrical hoop member, each tying member being in tension when the wheel assembly is unloaded.

22. The wheel assembly of claim 21, wherein the generally cylindrical hoop member is crowned.

23. The wheel assembly of claim 21, further comprising a rim attached to the central hub, and to which each tying member attaches.

* * * * *